United States Patent [19]
Van Kleeck et al.

[11] Patent Number: 5,260,034
[45] Date of Patent: Nov. 9, 1993

[54] STAGE CATALYST CONCENTRIC ANNULAR STRIPPER

[75] Inventors: David A. Van Kleeck, Sugarland, Tex.; Donald E. Hardesty, Sedona, Ariz.

[73] Assignee: Shell Oil Company, Houston, Tex.

[21] Appl. No.: 873,268

[22] Filed: Apr. 24, 1992

[51] Int. Cl.$^5$ .......................... B01J 8/26; F27B 15/00
[52] U.S. Cl. .................................. 422/142; 422/140; 422/141; 422/144
[58] Field of Search .......... 261/123; 422/144, 140-142

[56] References Cited

U.S. PATENT DOCUMENTS

| | | | |
|---|---|---|---|
| 175,827 | 4/1876 | Deeds | 261/123 |
| 1,594,947 | 8/1926 | Hartman et al. | 261/123 |
| 2,567,959 | 9/1951 | Munday | 422/142 X |
| 2,758,959 | 8/1956 | Nicolai | 196/50 |
| 2,760,910 | 8/1956 | Fritz et al. | 196/50 |
| 2,829,955 | 4/1958 | Goedkoop | 422/147 X |
| 3,236,607 | 2/1966 | Porter, Jr. et al. | 422/141 |
| 3,565,827 | 2/1971 | Friday | 422/142 |
| 4,036,779 | 7/1977 | Schatz et al. | 252/417 |
| 4,464,247 | 8/1984 | Thacker | 422/142 X |
| 4,476,160 | 10/1984 | Tsao | 422/144 |
| 4,481,103 | 11/1984 | Krambeck et al. | 208/120 |
| 4,574,044 | 3/1986 | Krug | 208/120 |
| 4,740,216 | 4/1988 | Allard | 422/141 X |
| 4,925,632 | 5/1990 | Thacker et al. | 422/142 |

FOREIGN PATENT DOCUMENTS 0630495 4/1963 Fed. Rep. of Germany ...... 261/163

OTHER PUBLICATIONS

"New Fluid Bed Retort Exchanges Solids but not Gases," Synthetic Fuels Report, Jun. 1985, pp. 2-14 through 2-15.

Primary Examiner—James C. Housel
Assistant Examiner—Amalia Santiago
Attorney, Agent, or Firm—Kimbley L. Muller

[57] ABSTRACT

A process and apparatus for rapid stripping of fluid cracking catalyst is disclosed. A series of concentric annular beds provide rapid initial removal of hydrocarbons from the interstices of the catalyst particles. Successive stages of stripping allow time for hydrocarbon diffusion from catalyst's pores while maintaining low hydrocarbon partial pressure. Residence times increase as the catalyst passes to the different catalyst beds.

6 Claims, 1 Drawing Sheet

STAGE CATALYST CONCENTRIC ANNULAR STRIPPER

FIELD OF THE INVENTION

This invention is concerned with a stripping apparatus to remove components which have been absorbed or entrained on the surface of the catalyst.

The field of this invention is also concerned with a staged concentric annular bed stripper having concentric stripping chambers situated intermediate an FCC riser reactor and an FCC regenerator.

DESCRIPTION OF RELATED ART

Many techniques in the past have addressed problems of stripping catalyst which have become spent as a result of use in the cracking of long chain hydrocarbons to hydrocarbons having shorter chains.

In a paper entitled "New Fluid Bed Retort Exchanges Solids But Not Gases" appearing in *Synthetic Fuels Report*, June, 1985, a system is described for an oil shale retort in which the combustor exchanges solids with the retort but in which the combustion gases and the product gases are kept separate. The design of the retort comprises an annular situated fluidized bed having two segmented compartments, one for the retort side and one for the combustor side. The feed shale is added to the retort side while the spent shale is removed from the combustor side. Steam is provided through the retort side while air is provided through the combustor side. Communication is made between these two annular zones through the use of a baffle system where fluidized shale passes from the retort side to the combustor side at the bottom of the zone and where feed shale is recycled back to the retort from the combustor side via a baffle at the top of the zone. In this manner, large circulation flows can be achieved with little gas mixing. A plan view of the retort-combustor shows that baffles can achieve controlled temperature profile within the system. The reactor system is disclosed as having many potential application, including gasification and pyrolysis of coal, hydrogen production, heat exchange, and sulfur dioxide removal by adsorption or absorption.

Communication between a hydrocarbon reactor and a catalyst regenerator has been well developed in the art. For example, in Krambeck et al, U.S. Pat. No. 4,481,103 (1984) a process is described for the reduction of sulfur dioxide emissions from FCC regenerators accomplished by steam stripping of the catalyst at 500° to 700° C. for one to ten minutes. In fluid hydroforming, as exemplified by U.S. Pat. Nos. 2,758,959, Nicolai, and 2,760,910, Fritz et al, a stripper zone interconnects a reactor and a regenerator to provide a closed catalytic system to treat and upgrade hydrocarbon fractions.

Modifications to stripping zones have been undertaken to maximize the effect of stripping. For example, in Tsao, U.S. Pat. No. 4,476,160 (1984), a stripping process is advantaged by the presence of a vent line from the top of the stripping vessels to the fluidized bed for venting gas from the stripper to the fluidized bed. A portion of the solids introduced into the stripper are carried into the vent line to maintain a static head pressure between the top portion of the fluidized bed and the stripping vessel. The implementation of baffles to a stripping zone is shown in U.S. Pat. No. 4,036,779, Schatz et al (1977), wherein baffles 28 are shown in stripper section 24 of FIG. 2 to aid the passage of catalyst in a downward progression to ultimate discharge from the bottom of the reaction zone to the regeneration zone. Additional steam stripping of catalyst is shown in Krug, U.S. Pat. No. 4,574,044 (1986), in which spent catalyst after normal steam stripping is subjected to additional periods of stripping from one-half to 30 minutes at elevated temperatures. Such additional steam stripping exposure allows the stripped spent catalyst to react with the steam to produce one or more benefits to the overall FCC operation as delineated at column 3, lines 10-24.

BRIEF SUMMARY OF THE INVENTION

A process is provided for the rapid stripping of fluidized catalyst. An apparatus is provided comprising a staged concentric annular stripper having multiple annularly situated stripping chambers. Hydrocarbons and other components contained in the interstices of the catalyst particle are removed by the annular concentric stripping as a result of the additional time allowed for hydrocarbon diffusion. The apparatus also provides a means of providing stripping while maintaining low hydrocarbon partial pressure.

DETAILED DESCRIPTION OF THE INVENTION

The apparatus of this invention provides for a concentric ring geometry of catalyst stripping chambers contained in a catalyst stripping bed to remove hydrocarbons absorbed or entrained on the surface or in the pores of the catalyst.

The advantages of removing these adsorbed components is a reduction in the amount of unwanted pollutants contained in the emissions from the regeneration zone. For example, if sulfur is absorbed on the catalyst particles and not removed in the stripper, the amount of $SO_x$ in the exit gas of the regenerator will be increased. It is beneficial to remove these components during the stripping function particularly if the stripping can be conducted at temperatures and pressures which will not affect the long or short term activity of the catalyst. Temperatures ranging from 950° F. to 1050° F. and pressures between 5 and 15 psig will be maintained in the stripping section or apparatus using this invention while a higher effectiveness of stripping (as measured by examination of the carbon content of the stripped catalyst) is achieved.

The stripping gas can be nitrogen, but is preferably steam. It is preferred that a stripping gas be added to each concentric ring of the stripping zone comprising one chamber in each concentric ring. Stripping gas is a fluid which is entered at the bottom of each concentric stripping chamber through aeration rings to provide the flow of stripping fluid or gas through the fluidized bed of spent catalyst particles. The catalyst particles entering the stripping zone pass from the inlet to the outlet of the stripping zone in an undulating or serpentine direction of flow. Spent catalyst pass from the reaction zone to the stripping zone by means of a catalyst inlet means. This inlet means can comprise a straight pipe or conduit or it may comprise a straight pipe or conduit connected to a funnel system having an angle of between 30° and 50° for the passage of catalyst from the reactor to the stripping chamber.

The level of the catalyst particles in the stripping chamber can be controlled by a baffle system located on the top portion of every other annular chamber. Catalyst which enters through the catalyst inlet means passes from the top of the stripping zone to the bottom of the stripping zone in which stripping occurs. The stripping parameters in this initial stripping stage comprise a temperature of about 900° F. to about 1050° F. and a pressure of about 10 psig to about 50 psig. Steam or nitrogen flows in through aeration rings at the bottom of the stripping zone where communication is made between the initial catalyst added to the stripper and the first annular stripping chamber. The first annular stripping chamber, and every other annular stripping chamber thereafter, comprises a baffle at the top of that chamber for the communication of catalyst from one chamber to the next during stripping. To aid communication of the catalyst particles from every stripping chamber which does not possess a baffle system at the top of the chamber an area is provided intermediate the chamber wall and the bottom of the stripping zone for passage of the catalyst particles from the bottom of one stripping chamber to the bottom of the next stripping chamber.

It is preferred that at each communication between the bottom of the stripping chambers, stripping fluid inlet means are provided to maintain a constant flow of stripping fluid to the stripping zone. In a preferred embodiment of this invention, the staged concentric annular bed stripping zone comprises annular stripping chambers having different catalytic volumes. The catalytic volumes are defined as the dimensions of the chamber walls relative to one another. Looking at a cross section of these stripping chambers, one would visualize chambers of greater concentric dimensions as the chambers get closer to the catalyst inlet. In this manner, the catalyst in the last catalyst stripping chamber spends a shorter amount of time in that particular chamber (where less components are still present in the interstitial voids of the catalyst particle) than in the first chamber.

The number of annular chambers can vary from as few as two to as many as 10. They should be designed so that the maximum amount of interstitial unwanted components are removed during the stripping process at the lowest hydrocarbon partial pressure possible. As the catalyst meanders in its serpentine path from the catalyst stripper inlet to the catalyst stripper outlet, it progresses through multiple catalyst stripping chambers in which the catalyst is relieved of its unwanted components. After removal from the stripping zone, the catalyst is added to a regeneration zone for the combustion of carbon components remaining on the catalyst in any manner acceptable for that process or procedure. The continuous addition of catalyst results in the radial serpentine flow such that the catalyst particles cascade over the top of each other ring in the successive stripping chambers. One or more apertures may be placed at the top of these successive catalyst stripping chambers to progress communication of the fluidized catalyst from one concentric chamber to the next concentric chamber.

The residence time in the first catalyst stripping chambers will likely be in seconds with a greater residence time in the last beds. The beds may be designed to achieve constant stripping velocity by varying the spacing between the concentric rings.

DETAILED DESCRIPTION OF THE INVENTION

Figure 1:
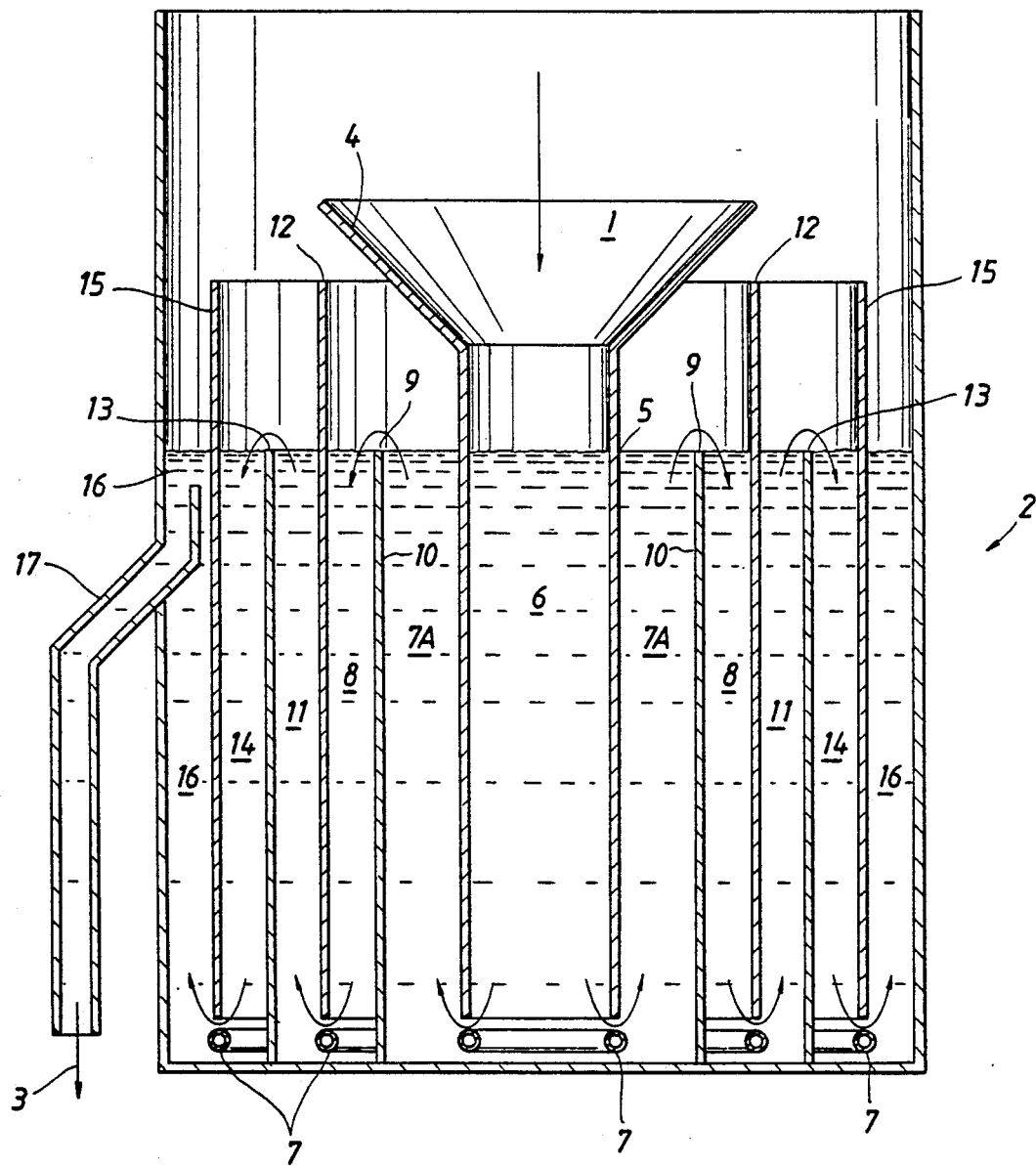
FIG. 1 is a cross-sectional view of a staged concentric annular bed stripping zone having multiple chambers for stripping.

FIG. 1 shows the serpentine passage of catalyst from the catalyst stripper inlet 1 to the catalyst stripper outlet 3. The catalyst can be added to the annular stripping bed 2 by means of a straight type addition or, as shown in the drawing, a funnel system 4 may be used having an angular displacement of 45° with the inlet 5 positioned directly above the catalyst stripping zone.

The inlet to the stripping zone 6 may act as an initial stripping zone wherein the catalyst is fluidized in the presence of stripping fluid or agent added by means of aeration rings 7. The catalyst descends from the top of the initial stripping zone 6 to the bottom of stripping zone 6 and passes to the first annular chamber 7A provided in concentric communication with both the initial stripping zone 6 and the second annular bed 8. Stripping is advantaged by dimensioning the annular chambers such that chamber 7A is larger than the initial stripping zone 6 and larger that the second stripping chamber 8. The catalyst contained in the annular stripping chamber 7A communicates with annularly situated chamber 8 by means of a serpentine passage over the top of baffle 9. This baffle may comprise many configurations including a static wall of particular elongated height. It is also possible that baffle 9 be connected to elongated wall 10 and contains one or more apertures for the passage of catalyst from concentric zone 7A to concentric zone 8. Catalyst contained in concentric zone 7A will flow in an upward progression relative to the top of the stripping zone after passage over baffle 9 or through elongated wall 10. In such a case, the catalyst passes in a downwardly situated progression through concentric chamber 8 through holes in baffle 9 (not shown).

Throughout both concentric chambers 7A and 8, unwanted components are removed from the interstitial void of the catalyst particles. Additional stripping fluid aeration rings 7 are provided at the bottom of concentric stripping chambers 8 and 11. Communication is made between chambers 8 and 11 through passage intermediate the bottom of stripping chamber 8 and the bottom of elongated wall 12 which separates stripping chambers 8 and 11. Elongated wall 12 is positioned at such a height that catalyst cannot pass over the top of wall 12 and thereby forces bottom communication between concentric chamber 8 and concentric chamber 11. Additional serpentine flow of the catalyst is provided over baffle 13, similar to baffle 9, dividing concentric chambers 11 and 14. Once catalyst flows over baffle 13, it enters concentric chamber 14. Once again, elongated wall 15 is provided to prohibit over the top communication between concentric stripping chamber 14 and concentric stripping chamber 16. Communication is made between these respective chambers intermediate the bottom of wall 15 and in the bottom of the stripping zone. As shown in FIG. 1, it is preferred that aeration rings 7 be provided at the bottom of these chambers to progress the path of the catalyst. The number of chambers designed for stripping can vary from at least 2 to as many as 10. The last concentric stripping chamber, (shown in this drawing as 16) communicates with catalyst outlet 3 by means of downcomer pipe 17. Catalyst removed from outlet means 3 can be passed to a regeneration zone for regeneration of catalyst.

Through the use of this apparatus and process catalyst enters the concentric annular bed stripper with multiple stripping chambers through inlet means 1 and progresses to outlet means 3 through the various elongated unevenly situated stripping chambers as depicted in FIG. 1 as 7, 8, 11, 14 and 16.

OBJECTS AND EMBODIMENTS

It is an object of this invention to provide a stripping process and apparatus to progress an advantaged stripping of hydrocarbon material from spent catalyst to reduce emissions from the catalyst regenerator.

It is another object of this invention to provide concentric stripping chambers in fluid communication with one another to progress stripping of the catalyst particle at the lowest possible hydrocarbon partial pressure.

In one aspect and embodiment of this invention resides in a process for the fluid catalytic cracking of a heavy hydrocarbon feedstock wherein the heavy hydrocarbon feedstock is contacted with a regenerated fluid catalytic cracking catalyst at elevated temperatures to produce cracked products and spent catalyst having entrained or adsorbed hydrocarbons, wherein the spent catalyst is separated from the cracked products and is stripped of said entrained or adsorbed hydrocarbons in a stripping zone containing a plurality of stripping chambers, the stripped catalyst is withdrawn from a last stripping chamber and passed to a regenerator for a treatment with an oxygen-containing gas to yield regenerated catalyst, and the regenerated catalyst is recycled and brought into contact with the heavy hydrocarbon feedstock, wherein the catalyst in the stripping zone undergoes introduction of the catalyst into a first chamber in said stripping zone wherein stripping gas is added to said first chamber and a stream of hydrocarbon-containing stripping gas is withdrawn therefrom; flowing of the catalyst to a second chamber in the stripping zone over a first baffle dividing the first chamber from the second chamber wherein stripping gas is added to the second chamber and a stream of hydrocarbon-containing stripping gas is withdrawn therefrom; flowing of the catalyst to a third chamber under a second baffle dividing the second chamber from the third chamber wherein stripping gas is added to the third chamber and a stream of hydrocarboncontaining stripping gas is withdrawn therefrom; passing the catalyst to a next stripping chamber or to a means for withdrawing the catalyst; and the respective streams of hydrocarbon-containing stripping as produced are passed to a means for recovering said hydrocarbons.

Another embodiment of this invention regards in an apparatus for stripping entrained or adsorbed components from used catalyst particles in a staged concentric annular stripping zone having multiple stripping chambers having a top and a bottom and a catalyst inlet and outlet means which apparatus comprises a catalyst inlet means communicating with a reaction zone and the bottom of the stripping zone is positioned such that catalyst passed to the stripping zone bottom is located concentric with said multiple stripping chamber; a first elongated stripping chamber is located annularly next to said catalyst inlet means and communicating at the bottom of said stripping zone with said catalyst inlet means and a second stripping chamber; a second elongated stripping chamber is located annularly next to said first stripping chamber and communicating at the top of said stripping zone with said first stripping chamber and either a catalyst outlet means or successive annularly situated additional stripping chambers; a multiple set of baffles for each alternative stripping chamber which communicates with the next annularly situated stripping chamber at the top of said stripping zone; a multiple set of fluid inlet means for addition of a fluid stripping medium to said stripping zone; a catalyst outlet means for removing said stripping zone; a stripping gas outlet means for removing said stripping gas from said stripping zone; and a series of additional elongated annularly situated stripping chambers communicating said second stripping chamber with said catalyst outlet means.

What is claimed is:

1. An apparatus for stripping entrained or adsorbed components from catalyst particles, the apparatus comprising:

a cylindrical housing having a catalyst inlet means, a catalyst outlet means and a stripping gas outlet means:

a plurality of annular baffles disposed concentrically in said housing and defining a plurality of elongated concentric annular stripping chambers, each chamber being defined by and between each two adjacent baffles, said baffles being constructed and arranged to provide a serpentine flow path of catalyst therethrough:

said plurality of elongated annular concentric stripping chambers collectively defining a staged concentric annular stripping zone having a top region and a bottom region, each of said plurality of chambers having a top region and a bottom region, and each of said chambers being in fluid communication with at least one adjacent chamber such that catalyst is passed in said serpentine flow path from one chamber to said at least one adjacent chamber:

said catalyst inlet means communicating with the bottom region of the stripping zone and concentric with said plurality of stripping chambers;

said plurality of elongated annular concentric stripping chambers comprising:

a) a first elongated stripping chamber located annularly next to, surrounding, and in fluid communication with said catalyst inlet means, b) a second elongated stripping chamber located annularly next to, surrounding, and in fluid communication with said first stripping chamber and either one of (i) said catalyst outlet means, or (ii) a successive one of said plurality of elongated annular concentric chambers, wherein said plurality of elongated annular concentric chambers are constructed to contain different catalyst volumes, wherein the chamber located closest to the catalyst inlet means is sized to hold the largest catalyst volume and each successive chamber of said plurality of chambers is sized to hold a smaller catalyst volume;

c) a plurality of fluid inlet means for addition of a fluid stripping medium to said stripping zone, said plurality of fluid inlet means being disposed in the bottom region of said zone:

wherein said catalyst outlet means is in fluid communication with an outermost chamber of said plurality of elongate concentric annular stripping chambers.

2. The apparatus of claim 1, wherein said catalyst inlet means communicates with said bottom of said stripping zone and extends downwardly to said bottom of said stripping zone, wherein said inlet means is positioned centrally with respect to the plurality of annularly situated catalyst stripping chambers.

3. The apparatus of claim 1 wherein at least one of a said plurality of baffles is constructed with at least one aperture through which catalyst from one stripping chamber can pass to the next stripping chamber.

4. The apparatus of claim 1 wherein the fluid inlet means comprise a plurality of aeration rings for passage of steam or nitrogen to said stripping chambers.

5. The apparatus of claim 4 wherein the steam aeration rings are situated horizontal intermediate each two adjacent of said stripping chambers and located at a position proximate to the stripping chambers where between adjacent chambers communication occurs at the bottom of said stripping zone.

6. The apparatus of claim 1, wherein said catalyst inlet means extends the vertical length of said stripping zone to the bottom of said stripping chamber.

* * * * *